(No Model.)
C. M. TOLAND.
SUPPORT BRACKET FOR LAMPS, GAS BURNERS, OR THE LIKE.
No. 604,133. Patented May 17, 1898.
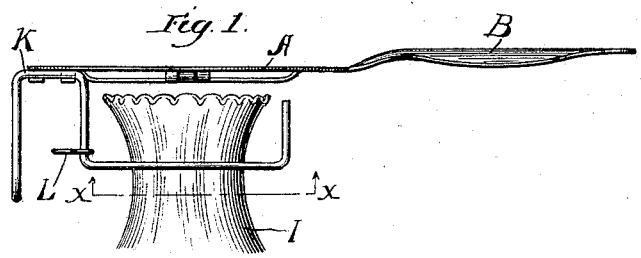
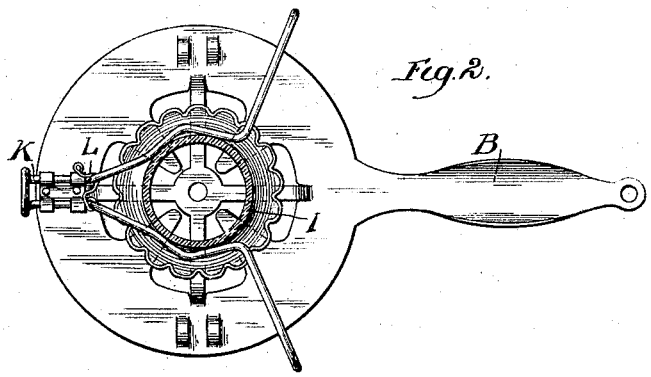
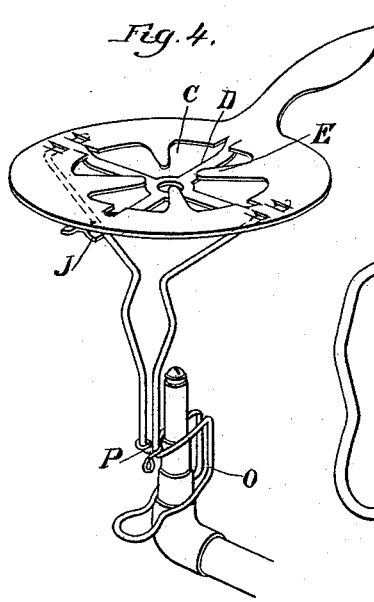
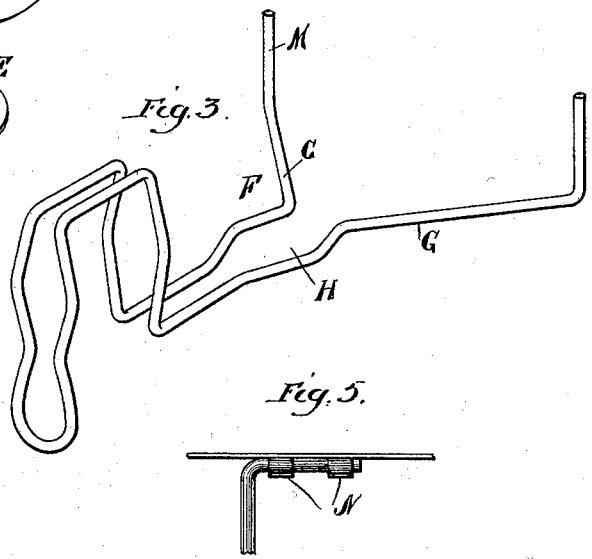
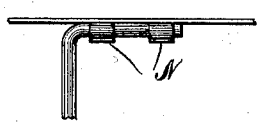
Witnesses:
H. B. Hallock.
H. Williamson.
Inventor:
Charles M. Toland.
by Geo. H. Holgate
Attorney.
THE NORRIS PETERS CO., PHOTO-LITHO., WASHINGTON, D. C.

UNITED STATES PATENT OFFICE.

CHARLES M. TOLAND, OF WILMINGTON, DELAWARE.

SUPPORT-BRACKET FOR LAMPS, GAS-BURNERS, OR THE LIKE.

SPECIFICATION forming part of Letters Patent No. 604,133, dated May 17, 1898.

Application filed September 15, 1897. Serial No. 651,709. (No model.)

*To all whom it may concern:*

Be it known that I, CHARLES M. TOLAND, a citizen of the United States, residing at Wilmington, in the county of New Castle and State of Delaware, have invented a certain new and useful Improvement in Support-Brackets for Lamps, Gas-Burners, or the Like, of which the following is a specification.

My invention relates to a new and useful improvement in support-brackets for lamps, gas-burners, and the like, and has for its object to provide a simple, cheap, and effective attachment which may be quickly applied to either a lamp-chimney or gas-burner and when in place will serve to support a cooking utensil or similar article, whereby the contents thereof may be heated for cooking or like purposes.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is an edge view of my improvement as applied to a lamp-chimney; Fig. 2, a section at the line *x x*, looking in the direction of the arrows; Fig. 3, a detail perspective of the support-bracket; Fig. 4, a perspective of my improvement when adjusted to a gas-burner; and Fig. 5, a detail edge view of a portion of one end of the support-bracket and of the support-plate, illustrating the manner of attaching one to the other when the device is adjusted for use, as shown in Fig. 4.

In carrying out my invention as here embodied, A represents the support-plate, having a handle B formed therewith or attached thereto, whereby the device may be conveniently manipulated, and the center of this plate is cut away, as indicated at C, leaving the cross-ribs D, which are bent downward into a lower horizontal plane than the plate proper, thus leaving the projecting fingers E for the support of the utensil placed upon the plate. The object of depressing the cross-ribs is to provide a surface against which the direct action of the flame of the burner or lamp will be directed and which will therefore provide for the accumulation of a certain amount of soot which would otherwise be deposited upon the bottom of the cooking utensil.

The support-bracket is here shown as composed of a single piece of wire so bent as to provide the arms G, in which are formed the jaws or clamping-section H, whereby it may be secured around the lamp-chimney I, as clearly indicated in Figs. 1 and 2, and this bracket when adjusted for use in connection with a lamp-chimney is attached to the under side of the support-plate by means of the clip J, with which the section K of the bracket engages and with which it is held in engagement by the catch-hook L. When thus adjusted, the device may be quickly attached or detached from a lamp-chimney and when in position will readily hold a cooking utensil of small size in such relative position to the chimney as to permit the thorough heating of the contents of the utensil, thus utilizing the waste heat from the lamp for this purpose, and, if desired, the device may be adapted for the support of heavier utensils by so locating the upturned ends M of the arms G as to bring them in contact with the under side of the support-plate, which will add rigidity to the latter.

In order to adapt my improvement for use in connection with a gas-burner, the support-bracket is disengaged from the clip J and its position reversed, so that the projecting ends M may be forced into engagement with the clips N, here shown as being formed by partially cutting the stock from the plate and depressing the same, but which may be provided in any suitable manner. When the bracket is thus attached to the plate, as shown in Fig. 4, it may be clamped upon the burner by the U-shaped portion O, which is adapted for this purpose, and may be rigidly held in place by the catch-hook P, secured thereon for that purpose.

When so supported, the place may then serve for holding cooking utensils, as above described, and with a like result.

One of the advantages of my improvement is its exceeding simplicity and cheapness in manufacture and the fact that it may be utilized in connection with either a lamp-chimney or gas-burner and may be adjusted for use by a person of little or no mechanical skill.

It is obvious that the device may be made of any suitable material; but I prefer that the supporting-bracket shall be of spring-wire.

Having thus fully described my invention, what I claim as new and useful is—

1. In combination, a supporting-plate having a portion of its center cut away, cross-ribs lying in a lower plane than the plate, a handle carried by the plate by means of which it may be manipulated, a supporting-bracket adapted to be attached in two positions to the under side of the plate, and means for securing said bracket upon either a lamp-chimney or gas-burner, as shown and described.

2. The herein-described combination of a supporting-plate having a portion of its center cut therefrom, cross-ribs lying in a lower horizontal plane, fingers projecting toward the center of the plate, a handle formed with the plate for its manipulation, clips secured to the under side of the plate, a supporting-bracket consisting of a single piece of wire so bent as to be attached to the under side of the plate in two positions and to either a lamp-chimney or gas-burner, and catch-hooks attached to the supporting-bracket whereby the latter may be clamped in position, as specified.

3. As a new article of manufacture, a supporting-plate having its center cut away, ribs extending across said cut-away portion and lying in a lower plane than the plate, fingers projecting into said cut-away portion and lying in the same plane as said plate, and means for supporting said plate above a lamp-chimney or gas-fixture, as and for the purpose described.

4. A bracket for a heating attachment consisting of a single piece of wire doubled on itself and bent to produce a Y-shaped figure, the body of said bracket being bent to form a U-shaped portion, the ends of the arms being bent parallel with said U-shaped portion, and a plate adapted to be engaged by the U-shaped portion or by the ends of the arms, substantially as shown and described.

In testimony whereof I have hereunto affixed my signature in the presence of two subscribing witnesses.

CHARLES M. TOLAND.

Witnesses:
S. S. WILLIAMSON,
WM. W. PRITCHETT.